(12) United States Patent
Tandler et al.

(10) Patent No.: US 10,889,708 B2
(45) Date of Patent: Jan. 12, 2021

(54) POLYMER COMPOSITION FOR CAPS AND CLOSURES

(71) Applicant: SABIC GLOBAL TECHNOLOGIES B.V., Bergen op Zoom (NL)

(72) Inventors: Renate Francisca Tandler, Geleen (NL); Antonius Sevriens, Geleen (NL); Haika Johanna Hildebrandt, Geleen (NL); Johannes Petrus Joseph Gerardus Sthijns, Geleen (NL); Philippe Rasquin, Geleen (NL); Deliani Lovera, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 11 days.

(21) Appl. No.: 16/324,070

(22) PCT Filed: Aug. 10, 2017

(86) PCT No.: PCT/EP2017/070295
§ 371 (c)(1),
(2) Date: Feb. 7, 2019

(87) PCT Pub. No.: WO2018/029293
PCT Pub. Date: Feb. 15, 2018

(65) Prior Publication Data
US 2019/0161604 A1 May 30, 2019

(30) Foreign Application Priority Data
Aug. 11, 2016 (EP) .................................. 16183787

(51) Int. Cl.
| | |
|---|---|
| C08L 23/14 | (2006.01) |
| C08L 23/06 | (2006.01) |
| B65D 41/00 | (2006.01) |
| B65D 41/18 | (2006.01) |
| C08L 23/08 | (2006.01) |
| C08F 210/06 | (2006.01) |

(52) U.S. Cl.
CPC ............ *C08L 23/142* (2013.01); *B65D 41/00* (2013.01); *B65D 41/18* (2013.01); *C08L 23/06* (2013.01); *C08L 23/0815* (2013.01); *C08F 210/06* (2013.01); *C08F 2500/08* (2013.01); *C08F 2500/12* (2013.01); *C08F 2800/20* (2013.01)

(58) Field of Classification Search
CPC ........... C08L 2205/035; C08L 2205/03; B65D 41/18
See application file for complete search history.

(56) References Cited

U.S. PATENT DOCUMENTS

| | | | |
|---|---|---|---|
| 6,028,145 | A | 2/2000 | Niebergall et al. |
| 6,559,230 | B2 | 5/2003 | Heck et al. |
| 8,729,200 | B2 | 5/2014 | Hermel-Davidock et al. |
| 2002/0137835 | A1* | 9/2002 | Abraham ................ C08L 23/16 524/487 |
| 2007/0244253 | A1* | 10/2007 | Abraham ................ C08L 23/04 525/98 |
| 2011/0105667 | A1 | 5/2011 | Brenner et al. |
| 2014/0021157 | A1 | 1/2014 | Gren et al. |
| 2016/0289359 | A1* | 10/2016 | Park ................... C08F 4/65904 |

FOREIGN PATENT DOCUMENTS

| | | |
|---|---|---|
| EP | 0663937 B1 | 7/1995 |
| EP | 2010576 B1 | 1/2009 |
| EP | 2076551 B1 | 7/2009 |
| EP | 2077269 B1 | 7/2009 |
| EP | 2185611 B1 | 5/2010 |
| EP | 2326654 B1 | 6/2011 |
| EP | 2365990 B1 | 9/2011 |

OTHER PUBLICATIONS

International Search Report for International Application No. PCT/EP2017/070295, International Filing Date Aug. 10, 2017, dated Oct. 16, 2017, 4 pages.
Written Opinion for International Application No. PCT/EP2017/070295, International Filing Date Aug. 10, 2017, dated Oct. 16, 2017, 5 pages.

* cited by examiner

Primary Examiner — Jeffrey C Mullis
(74) Attorney, Agent, or Firm — Cantor Colburn LLP

(57) ABSTRACT

Caps and closures comprising high density polyethylene, polyolefin elastomer and polypropylene wherein the amount of high density polyethylene is more than 50% by weight of the total amount of high density polyethylene, polyolefin elastomer and polypropylene and wherein the total amount of high density polyethylene, polyolefin elastomer and polypropylene is 100% by weight.

20 Claims, No Drawings

POLYMER COMPOSITION FOR CAPS AND CLOSURES

CROSS REFERENCE TO RELATED APPLICATIONS

This application is a 371 of International Application No. PCT/EP2017/070295, filed Aug. 10, 2017, which is incorporated herein by reference in its entirety, and which claims the benefit of EP Provisional Application No. 16183787.7, filed Aug. 11, 2016.

The present invention relates to a polymer composition for use in the production of caps and closures.

In the technical field of caps and closures, current developments are directed towards improved cost efficiency. This encompasses three basic elements being the raw material reduction (light weighting) enabling lower material costs, cycle time reduction allowing higher output at improved speed and energy reduction leading to lower resources costs.

Especially light weighting remains a key issue in closure designs. However, simple light weighting in packaging is not so simple anymore, since the caps and closures still need to have a good mechanical performance. In particular, environmental stress crack resistance (ESCR) and impact are important. Consequently, new materials that meet those requirements need to be developed.

It has now surprisingly been found that the use of a resin composition comprising high density polyethylene (HDPE) as matrix material and polyolefin elastomer (POE) and polypropylene (PP) in the production of caps and closures results in an excellent combination of ESCR and impact which allows for further light weighting.

The caps and closures according to the invention comprise high density polyethylene, polyolefin elastomer and polypropylene wherein the amount of high density polyethylene is more than 50% by weight of the total amount of high density polyethylene, polyolefin elastomer and polypropylene and wherein the total amount of high density polyethylene, polyolefin elastomer and polypropylene is 100% by weight.

According to a preferred embodiment of the invention the caps and closures are characterized in that the caps and closures comprise HDPE in a range between >50% by weight and <100% by weight, PP in a range between >0.1% by weight and ≤40% by weight and POE in a range between >0.1% by weight and ≤40% by weight.

According to a preferred embodiment of the invention the caps and closures comprise HDPE in a range between >55% by weight and <100% by weight, PP in a range between ≥5% by weight and ≤35% by weight and POE in a range between ≥2% by weight and ≤40% by weight.

According to a preferred embodiment of the invention the caps and closures comprise HDPE in a range between >55% by weight and <100% by weight, PP in a range between >5% by weight and ≤35% by weight and POE in a range between ≥2% by weight and ≤20% by weight.

According to a preferred embodiment of the invention the caps and closures comprise HDPE in a range between ≥55% by weight and <100% by weight, PP in a range between ≥5% by weight and ≤35% by weight and POE in a range between ≥5% by weight and ≤20% by weight.

According to a preferred embodiment of the invention the caps and closures comprise HDPE in a range between ≥55% by weight and <100% by weight, PP in a range between ≥10% by weight and ≤30% by weight and POE in a range between ≥5% by weight and ≤20% by weight.

According to a preferred embodiment of the invention the caps and closures comprise HDPE in a range between ≥55% by weight and <80% by weight, PP in a range between ≥10% by weight and ≤30% by weight and POE in a range between ≥5% by weight and ≤20% by weight.

According to a preferred embodiment of the invention the caps and closures comprise HDPE in a range between >55% by weight and <70% by weight, PP in a range between >22% by weight and <29% by weight and POE in a range between ≥5% by weight and ≤20% by weight.

According to a preferred embodiment of the invention the resin composition comprises HDPE in a range between ≥52% by weight and ≤100% by weight.

According to a preferred embodiment of the invention the resin composition comprises HDPE in a range between ≥52% by weight and <80% by weight.

According to a preferred embodiment of the invention the resin composition comprises HDPE in a range between ≥55% by weight and ≤70% by weight.

According to a preferred embodiment of the invention the resin composition comprises HDPE in a range between >55% by weight and <70% by weight.

According to a preferred embodiment of the invention the resin composition comprises PP in a range between >0.1% by weight and ≤40% by weight.

According to a preferred embodiment of the invention the resin composition comprises PP in a range between >5% by weight and <35% by weight.

According to a preferred embodiment of the invention the resin composition comprises PP in a range between >10% by weight and <30% by weight.

According to a preferred embodiment of the invention the resin composition comprises PP in a range between ≥20% by weight and <30% by weight.

According to a preferred embodiment of the invention the resin composition comprises POE in a range between >0.1% by weight and ≤40% by weight.

According to a preferred embodiment of the invention the resin composition comprises POE in a range between ≥2% by weight and <40% by weight.

According to a preferred embodiment of the invention the resin composition comprises POE in a range between >2% by weight and ≤20% by weight.

According to a preferred embodiment of the invention the resin composition comprises POE in a range between ≥5% by weight and ≤20% by weight.

According to a preferred embodiment of the invention the resin composition comprises POE in a range between >4% by weight and ≤20% by weight.

According to a preferred embodiment of the invention the resin composition comprises POE in a range between >4% by weight and <15% by weight.

According to another preferred embodiment of the invention, the amount of PP is higher than the amount of POE and wherein this is based on the wt % of PP and the wt % of POE.

According to another preferred embodiment of the invention, the weight amount of high density polyethylene is higher than the weight amount of polypropylene and wherein this is based on the wt % of high density polyethylene and the wt % of polypropylene.

According to a preferred embodiment of the invention the density of HDPE ranges between ≥940 and ≤964 kg/m³ (measured according to ISO 1183).

According to a further preferred embodiment of the invention the density of HDPE ranges between ≥950 and ≤958 kg/m³ (measured according to ISO 1183).

According to a further preferred embodiment of the invention the density of HDPE ranges between >950 and <955 kg/m³ (measured according to ISO 1183).

According to a preferred embodiment of the invention the MFI of HDPE ranges between ≥0.1 and ≤30 g/10 min (measured according to ISO 1133 at 190 degrees Celsius and 2.16 kg).

According to a preferred embodiment of the invention the MFI of HDPE ranges between ≥0.6 and ≤15 g/10 min (measured according to ISO 1133 at 190 degrees Celsius and 2.16 kg).

According to a preferred embodiment of the invention the MFI of HDPE ranges between ≥0.6 and ≤3 g/10 min (measured according to ISO 1133 at 190 degrees Celsius and 2.16 kg).

HDPE may be unimodal HDPE and multimodal HDPE for example bimodal HDPE and trimodal HDPE.

According to a preferred embodiment of the invention the HDPE is multimodal HDPE.

The production processes of the HDPE is summarized in "Handbook of Polyethylene" by Andrew Peacock (2000; Dekker; ISBN 0824795466) at pages 43-66. Suitable catalysts for the production of polyethylene include Ziegler Natta catalysts, chromium based catalysts and single site catalysts.

The unimodal polyethylene may be obtained for example by polymerizing ethylene and optionally at least one olefin comonomer in slurry in the presence of a silica-supported chromium-containing catalyst and an alkyl boron compound. Suitable comonomers include for example propylene, 1-butene, 1-pentene, 4-methyl-1-pentene, 1-hexene and/or 1-octene.

The unimodal polyethylene may be obtained for example by polymerizing ethylene and optionally at least one olefin comonomer in a gas phase polymerization.

The production processes for bimodal high density polyethylene (HDPE) are summarized at pages 16-20 of "PE 100 Pipe systems" (edited by Bromstrup; second edition, ISBN 3-8027-2728-2). The production of bimodal high density polyethylene (HDPE) via a low pressure slurry process is described by Alt et al. in "Bimodal polyethylene-Interplay of catalyst and process" (Macromol. Symp. 2001, 163, 135-143). The characteristics of the polyethylene are determined amongst others by the catalyst system and by the concentrations of catalyst, co monomer and hydrogen. The production of bimodal high density polyethylene (HDPE) via a low pressure slurry process may also be performed via a three stage process. The concept of the two stage cascade process is elucidated at pages 137-138 by Alt et al. "Bimodal polyethylene-Interplay of catalyst and process" (Macromol. Symp. 2001, 163).

Suitable examples of polyolefin elastomer include for example ethylene-alpha olefin copolymer having 4-10 carbon atoms.

Suitable examples of ethylene-alpha olefin copolymers include for example ethylene-1-octene copolymer and ethylene-1-butene copolymer as described for example by L. T. Kale et al in "Structure property relationship of ethylene-1-octene copolymer and ethylene-1-butene copolymer made using insite technology" (1995 Polymers, Lamination and coatings Conference, pages 423-433).

Suitable ethylene-alpha olefin copolymers are also disclosed in U.S. Pat. Nos. 8,729,200B2, 6,559,230B2, EP2076551B, EP2326654B, EP2077269B, EP2365990B, EP2010576 and EP2185611B.

According to a preferred embodiment of the invention the ethylene-alpha olefin copolymer is an ethylene-octene copolymer.

According to a preferred embodiment of the invention the density of the polyolefin elastomer ranges between ≥857 and ≤880 kg/m³ (measured according to ASTM D1505).

According to a preferred embodiment of the invention the density of the polyolefin elastomer ranges between ≥865 and ≤870 kg/m³ (measured according to ASTM D1505).

According to a preferred embodiment of the invention the MFI of the polyolefin elastomer ranges between ≥0.5 and ≤30 g/10 min (measured according to ASTM D1238 at 190 degrees Celsius and 2.16 kg).

According to a preferred embodiment of the invention the MFI of the polyolefin elastomer ranges between ≥0.6 and ≤10 g/10 min (measured according to ASTM D1238 at 190 degrees Celsius and 2.16 kg).

According to a preferred embodiment of the invention the MFI of the polyolefin elastomer ranges between ≥0.6 and ≤5 g/10 min (measured according to ASTM D1238 at 190 degrees Celsius and 2.16 kg).

According to a preferred embodiment of the invention the MFI of the polyolefin elastomer ranges between ≥0.6 and ≤3 g/10 min (measured according to ASTM D1238 at 190 degrees Celsius and 2.16 kg).

The propylene polymer applied in the present invention may be a homopolymer, a random copolymer or a impact copolymer.

According to a preferred embodiment of the invention the propylene polymer is a impact copolymer.

According to a preferred embodiment of the invention the density of the PP ranges between ≥900 and ≤920 kg/m³ (measured according to ISO 1183).

According to a preferred embodiment of the invention the density of the PP ranges between >902 and <906 kg/m³ (measured according to ISO 1183).

According to a preferred embodiment of the invention the MFI of polypropylene ranges between 0.3 and 100 g/10 min (MFI is determined according to ISO 1133 at 230 degrees Celsius and 2.16 kg).

According to a preferred embodiment of the invention the MFI of polypropylene ranges between 0.3 and 20 g/10 min (MFI is determined according to ISO 1133 at 230 degrees Celsius and 2.16 kg).

According to a preferred embodiment of the invention the MFI of polypropylene ranges between 0.3 and 10 g/10 min (MFI is determined according to ISO 1133 at 230 degrees Celsius and 2.16 kg).

According to a preferred embodiment of the invention the MFI of polypropylene ranges between 0.3 and 5 g/10 min (MFI is determined according to ISO 1133 at 230 degrees Celsius and 2.16 kg).

Polypropylene compositions consisting of a propylene homopolymer, a random propylene copolymer or an impact copolymer are known.

Propylene homopolymer is obtained by polymerizing propylene under suitable polymerization conditions.

A propylene random copolymer is obtained by copolymerizing propylene and one or more other α-olefins, for example an α-olefin chosen from the group of α-olefin having 2 or 4 to 10 C-atoms, preferably ethylene, for example wherein the amount of α-olefin is less than 10 wt % based on the total propylene copolymer under suitable polymerization conditions. The preparation of propylene homopolymers and random copolymers is, for example, described in Moore, E. P. (1996) Polypropylene Handbook.

Polymerization, Characterization, Properties, Processing, Applications, Hanser Publishers: New York.

Impact polypropylene is defined here as a heterophasic propylene copolymer wherein the heterophasic propylene copolymer consists of
(a) a propylene-based matrix, wherein the propylene-based matrix is present in an amount of 60 to 95 wt % based on the total heterophasic propylene copolymer and
(b) a dispersed ethylene-α-olefin copolymer,
wherein the sum of the total amount of propylene-based matrix and total amount of dispersed ethylene-α-olefin copolymer is 100 wt %.

The propylene polymer applied, which may be a homopolymer, a random copolymer or a impact copolymer, can be made by any known polymerization technique as well as with any known polymerization catalyst system. Regarding the techniques, reference can be given to slurry, solution or gas phase polymerizations; regarding the catalyst system reference can be given to Ziegler-Natta, metallocene or single-site catalyst systems.

The polymer composition comprising high density polyethylene, a polyolefin elastomer and polypropylene may be applied as dry blend and as a compound.

All components can be added directly on the injection molding machine using a gravimetric dosing system.

All components can be added together as a dry blend. Mixing of the materials can be done by industrial mixing devices, such as Nauta mixer and Henschel mixers.

All components can be added together as a compound by melt blending. The compounding is usually carried out in a mixer (also known as a compounder), a single screw extruder or a twin screw extruder, wherein the polymer and the additives are melt-blended. Compounding techniques are well-known in the art.

The polymers in the resin composition and also the resin composition according to the invention may contain additives, for instance nucleating agents and clarifiers, stabilizers, release agents, fillers, plasticizers, anti-oxidants, lubricants, antistatics, scratch resistance agents, high performance fillers, pigments and/or colorants, impact modifiers, blowing agents, acid scavengers, recycling additives, coupling agents, anti-microbial, anti-fogging additives, slip additives, anti-blocking additives and polymer processing aids. These additives are well known in the art. The skilled person will choose the type and amount of additives such that they do not detrimentally influence the aimed properties of the composition.

Caps and closures according to the invention may be for example devices used to close or seal a bottle, a jar, a container or a can. The caps and closures according to the invention may be applied for example to close or seal devices containing mixtures of a liquid and a gas, for example single piece closures for beverages, especially for carbonated soft drinks, still water and juices. Closures are for example disclosed in US20140021157.

The invention will now be illustrated by the following non-limiting examples.

EXAMPLES

Example I

Test bars of a mixture comprising 66.5% by weight polyethylene (HDPE CC253 of SABIC), 5% by weight polyolefin elastomer (POE C1070D of SABIC) and 28.5% by weight impact polypropylene (PP 83MF90 of SABIC) were used to perform ESCR test according to ASTM D1693 Bent Strip ESCR test (10% Igepal CO-630, 50° C., method A) and VEM Impact resistance according to ISO 6603-2 (23° C./50% RH).

Result: see Table 1.

Comparative Example A shows the values for test bars comprising 100% by weight polyethylene (HDPE CC253 of SABIC).

TABLE 1

| Example | Blend | ESCR 50% fracture hours | Puncture Energy J |
|---------|-------|-------------------------|-------------------|
| A | HDPE CC253 | 9 | 37 |
| I | HDPE CC253/POE C1070D/PP 83MF90 | >1000 | 39 |

Example II

Test bars of a mixture comprising 56% by weight polyethylene (CC253 of SABIC), 20% by weight polyolefin elastomer (POE C1070D of SABIC) and 24% by weight random polypropylene (PP 620P of SABIC) were used to perform ESCR test according to ASTM D1693 Bent Strip ESCR test (10% Igepal CO-630, 50° C., method A) and VEM Impact resistance according to ISO 6603-2 (23° C./50% RH).

Comparative Example B shows the values for test bars comprising 100% by weight polyethylene (HDPE CC253 of SABIC), Result: see Table 2.

TABLE 2

| Example | Blend | ESCR 50% fracture hours | Puncture Energy J |
|---------|-------|-------------------------|-------------------|
| B | HDPE CC253 | 9 | 37 |
| II | HDPE CC253/POE C1070D/PP 620P | >1000 | 37 |

The examples I and II show clearly improved ESCR performance and the same or even better impact performance in comparison to the comparative examples A and B.

The invention claimed is:

1. Caps and closures comprising:
a high density polyethylene, a polyolefin elastomer, and a polypropylene wherein the amount of high density polyethylene is more than 50% by weight of the total amount of the high density polyethylene, the polyolefin elastomer and the polypropylene,
wherein the total amount of high density polyethylene, polyolefin elastomer and polypropylene is 100% by weight, and
wherein the polyolefin elastomer is an ethylene-alpha olefin copolymer derived from two monomers consisting of ethylene and an alpha olefin containing 4-10 carbon atoms.

2. The caps and closures according to claim 1, comprising the high density polyethylene in a range between ≥52% by weight and ≤100% by weight.

3. The caps and closures according to claim 1, comprising the polypropylene in a range between >0.1% by weight and ≤40% by weight.

4. The caps and closures according to claim 1, comprising the polyolefin elastomer in a range between >0.1% by weight and ≤40% by weight.

5. The caps and closures according to claim 1, comprising the high density polyethylene in a range between >50% by weight and <100% by weight and the polypropylene in a range between >0.1% by weight and ≤40% by weight and the polyolefin elastomer in a range between >0.1% by weight and ≤40% by weight.

6. The caps and closures according to claim 1, comprising the high density polyethylene in a range between >55% by weight and <100% by weight and the polypropylene in a range between ≥5% by weight and ≤35% by weight and the polyolefin elastomer in a range between ≥2% by weight and ≤20% by weight.

7. The caps and closures according to claim 1, comprising the high density polyethylene in a range between ≥55% by weight and <80% by weight and the polypropylene in a range between ≥10% by weight and ≤30% by weight and the polyolefin elastomer in a range between ≥5% by weight and ≤20% by weight.

8. The caps and closures according to claim 1, wherein an MFI of the high density polyethylene ranges between ≥0.1 and ≤30 g/10 min (measured according to ISO 1133 at 190 degrees Celsius and 2.16 kg) and/or a density of the high density polyethylene ranges between ≥950 and ≤958 kg/m$^3$ (measured according to ISO 1183).

9. The caps and closures according to claim 1, wherein an MFI of the high density polyethylene ranges between ≥0.6 and ≤15 g/10 min (measured according to ISO 1133 at 190 degrees Celsius and 2.16 kg) and/or a density of the high density polyethylene ranges between >950 and <955 kg/m$^3$ (measured according to ISO 1183).

10. The caps and closures according to claim 1, wherein an MFI of polypropylene ranges between 0.3 and 100 g/10 min (measured according to ISO1133 at 230 degrees Celsius and 2.16 kg) and/or a density of polypropylene ranges between ≥900 and ≤920 kg/m$^3$ (measured according to ISO 1183).

11. The caps and closures according to claim 1, wherein an MFI of the polypropylene ranges between 0.3 and 10 g/10 min (MFI is determined according to ISO 1133 at 230 degrees Celsius and 2.16 kg) and/or a density of the polypropylene ranges between >902 and <906 kg/m$^3$ (measured according to ISO 1183).

12. The caps and closures according to claim 1, wherein an MFI of the polyolefin elastomer ranges between ≥0.5 and ≤30 g/10 min (measured according to ASTM D1238 at 190 degrees Celsius and 2.16 kg) and/or a density of the polyolefin elastomer ranges between ≥857 and ≤880 kg/m$^3$ (measured according to ASTM D1505).

13. The caps and closures according to claim 1, wherein the ethylene-alpha olefin copolymer is ethylene-octene copolymer.

14. The caps and closures according to claim 1, wherein the polypropylene is impact polypropylene.

15. The caps and closures according to claim 1, wherein an amount of high density polyethylene is higher than an amount of the polypropylene and wherein this is based on the wt % of the high density polyethylene and the wt % of the polypropylene and/or the amount of the polypropylene is higher than the amount of the polyolefin elastomer and wherein this is based on the wt % of the polypropylene and the wt % of the polyolefin elastomer.

16. The caps and closures according to claim 1, wherein an MFI of the polyolefin elastomer ranges between ≥0.6 and ≤10 g/10 min (measured according to ASTM D1238 at 190 degrees Celsius and 2.16 kg) and/or a density of the polyolefin elastomer ranges between ≥865 and ≤870 kg/m$^3$ (measured according to ASTM D1505).

17. The caps and closures according to claim 1, wherein an MFI of the polyolefin elastomer ranges between ≥0.6 and ≤10 g/10 min (measured according to ASTM D1238 at 190 degrees Celsius and 2.16 kg) and a density of the polyolefin elastomer ranges between ≥865 and ≤870 kg/m$^3$ (measured according to ASTM D1505).

18. The caps and closures according to claim 1, comprising
the high density polyethylene in a range between ≥55% by weight and ≤70% by weight;
the polypropylene in a range between >5% by weight and <35% by weight; and
the polyolefin elastomer in a range between ≥2% by weight and ≤20% by weight.

19. The caps and closures according to claim 18, comprising
the polypropylene in a range between >10% by weight and <30% by weight; and
the polyolefin elastomer in a range between ≥5% by weight and ≤20% by weight.

20. Caps and closures comprising:
a high density polyethylene in a range between >55% by weight and <80% by weight,
a polyolefin elastomer in a range between ≥5% by weight and ≤20% by weight, and
a polypropylene in a range between ≥10% by weight and ≤30% by weight,
each based on the total amount of the high density polyethylene, the polyolefin elastomer and the polypropylene, wherein the total amount of high density polyethylene, polyolefin elastomer and polypropylene is 100% by weight, and
wherein the polyolefin elastomer is ethylene-octene copolymer.

* * * * *